United States Patent [19]

Barewald

[11] 4,429,311
[45] Jan. 31, 1984

[54] DUAL BEAM RADAR JAMMING SYSTEM

[75] Inventor: James R. Barewald, Mountain View, Calif.

[73] Assignee: Itek Corporation, Sunnyvale, Calif.

[21] Appl. No.: 88,997

[22] Filed: Nov. 6, 1970

[51] Int. Cl.³ .............................................. G01S 7/38
[52] U.S. Cl. ................................................. 343/18 E
[58] Field of Search .................................. 343/18 E

[56] References Cited

U.S. PATENT DOCUMENTS

| 3,187,258 | 6/1965 | Zolnik | 343/18 E |
| 3,500,401 | 3/1970 | Miller et al. | 343/18 E |
| 3,517,388 | 6/1970 | Vermillion | 343/18 E |
| 3,896,439 | 7/1975 | Lester et al. | 343/18 E |
| 3,955,200 | 5/1976 | Miller | 343/18 E |
| 4,149,167 | 4/1979 | Peters, Jr. et al. | 343/18 E |
| 4,264,909 | 4/1981 | Hamilton et al. | 343/18 E |

Primary Examiner—T. H. Tubbesing

[57] ABSTRACT

A dual beam radar jamming system for detecting and separating each radar signal of a dual beam radar system and then generating selectively modulated dual return signals for transmission back to the radar source to deceive its tracking apparatus. The jamming system includes a control unit which enables an operator to simultaneously monitor and control the jamming of each beam of a TWS radar system.

8 Claims, 9 Drawing Figures

DUAL BEAM RADAR JAMMING SYSTEM

BACKGROUND OF THE INVENTION

The present invention relates generally to radar apparatus commonly referred to as repeaters used for the purpose of deceiving enemy radar as to the range and angle of a target detected thereby. More specifically, the present invention is concerned with detecting dual scan threat radar signals and generating in response thereto separate deception signals for transmission back to each antenna of the dual scan tracking radar causing it to detect an inaccurate target position.

Radar systems currently in use are typically of the conical scan or dual scan types. The conical scan (CS) radar involves the use of the single antenna system which is either fixed in position or sweeps over a selected path locking onto a target when detected. The dual scan or track-while-scan (TWS) radar typically incorporates two interrelated antenna systems in which one of the antenna is energized at a first frequency and caused to sweep in the horizontal direction while the other antenna is energized at a second frequency and caused to sweep in the vertical direction. Whereas a single channel deception apparatus may be appropriate for use in jamming conical scan systems, such apparatus will only have partial effectiveness against the dual scan type of system since each scan antenna of the dual scan system can independently provide usable range and angle information. In order to provide maximum deception capability a dual channel jamming system is thus clearly more desirable than the single channel system for use against dual scan systems.

In addition, power output and jamming effectiveness considerations make dual jamming of dual beam radars desirable. One of the primary difficulties involved in using a single channel jammer to jam a dual channel radar is that traveling-wave tubes (TWT's) of the type used in jamming systems, when operating in the saturation region, have several characteristics that reduce their effectiveness when amplifying two RF frequencies simultaneously. One of these is called the capture effect, in which two frequencies at different power levels will receive different amounts of gain while passing through the traveling-wave tube. The resultant effect is that the signals emerge from the tube with power levels which are more widely separated than they were upon entrance. If the two different power levels are from the main lobe and sidelobe of the two radar beams, the main lobe signal will receive more gain than a sidelobe signal, thus tending to enhance the target rather than obscure it.

Another problem encountered in the two frequency operation of a TWT is intermodulation distortion, which tends to mix the two RF frequencies and direct power into various harmonics spread through the spectrum at frequencies separated by the original frequency separation. This has the obvious effect of reducing the power available for the input signals, thus reducing the power output on the proper frequencies. Extreme cases of this phenomenon have been noted where little or no power emerges from the TWT on the frequencies that were put into it.

A third result of jamming a dual channel radar with a single channel jammer is that of cross modulation within the jammer itself. Jamming modulation techniques generally depend in some way on detecting the passage of the main lobe and either down-modulating the jammer output during main lobe passage or turning the jammer on fully just after the peak of the main lobe passage. Since electrical signals corresponding to the two beams are in a single channel jammer simultaneously, the jammer inadvertently modulates both channels of the radar when the intent is to modulate just one. The result is to create in the threat receiver a moving dark gap which periodically uncovers the real target. In the case of main lobe offset jamming, a false target is presented which moves across the radar screen at the beat rate of the two beams, but vanishes when the two main lobes cross.

These technical difficulties thus lead to the conclusion that separating the radar beams in the jamming system is highly desirable. In addition, beam separation makes available the unobscured individual scans of the radar for observation and manual modulation. It is also worthy of note that jamming is generally more effective when both channels of the radar are jammed instead of just one. This is because the tracking function must use the square root of the sum of the squares of the tracking errors in the three coordinates: azimuth, elevation, and range. Obviously, by increasing the tracking error in two of the three coordinates, the total tracking error will be larger than if tracking error is increased in only one of the three.

Another observation favoring a dual channel system is the apparent double pulsing capability of certain types of enemy radar wherein the pulses from the two RF channels may be separated in time. A single jamming unit typically has a recovery time approaching 1 microsecond after pulsing, during which the jammer cannot respond to another pulse. However, in a dual channel jammer of the type provided by the present invention, the pulse from each radar channel passes through a separate jammer unit and is treated separately, thus circumventing the problem of responding immediately to another pulse.

The following prior art patents are of possible interest: Byrne U.S. Pat. No. 2,658,992, Purington U.S. Pat. No. 2,676,317, Henrici et al U.S. Pat. No. 2,862,204, Pettit U.S. Pat. No. 2,989,744, Goldmark U.S. Pat. No. 3,142,060, Barney et al U.S. Pat. No. 3,225,300, Harpster U.S. Pat. No. 3,258,771 and Tolles et al U.S. Pat. No. 3,504,366.

OBJECTS OF THE PRESENT INVENTION

It is therefore a primary object of the present invention to provide a dual channel radar deception repeater system for enabling the individual but simultaneous jamming of both receivers of a dual scan radar system while at the same time having the capability of jamming a single antenna conical scan system.

Another object of the present invention is to provide a dual channel radar deception repeater apparatus capable of detecting and separating radar signals from both channels of a dual scan radar, displaying the two signals individually and then generating individually controllable deception signals for transmission in each channel.

Still another object of the present invention is to provide a dual channel radar deception repeater system for causing the tracking gates of an automatic tracking dual beam radar to be shifted away from the true target return so as to cause the antenna thereof to be misdirected.

Still another object of the present invention is to provide a novel radar deception repeater system enabling an operator to simultaneously monitor and selectively transmit deception signals to either or both channels of a dual scan radar system.

SUMMARY OF THE PRESENT INVENTION

In accordance with the present invention, a dual beam radar jamming system is provided which increases the capability of an aircraft's defense against certain types of track-while-scan (TWS) radars while enlarging and capitalizing on the proven concepts of radar jamming and operator involvement. The system includes a pair of jamming units coupled to a receiving antenna system through a directional filter network which separates out certain bands of frequencies for application to one of the jamming units while passing all other frequencies to the other jamming unit. The system also includes a combination automatic-manual control-display unit which enables an operator to simultaneously control and inspect the results of the dual beam jamming operation. The integration of active and passive equipment functions such as manual gating and correlation makes use of proven techniques and interfaces to acquire an optimum mix of automatic and manual operation. While the operator is still very much in the loop, his skill and attention are directed to tactical situation assessment and jamming of the prime threats. The protection offered by the entire system covers all threats, bands, and angles of interest.

IN THE DRAWING

DETAILED DESCRIPTION OF A PREFERRED EMBODIMENT

Figure 1:
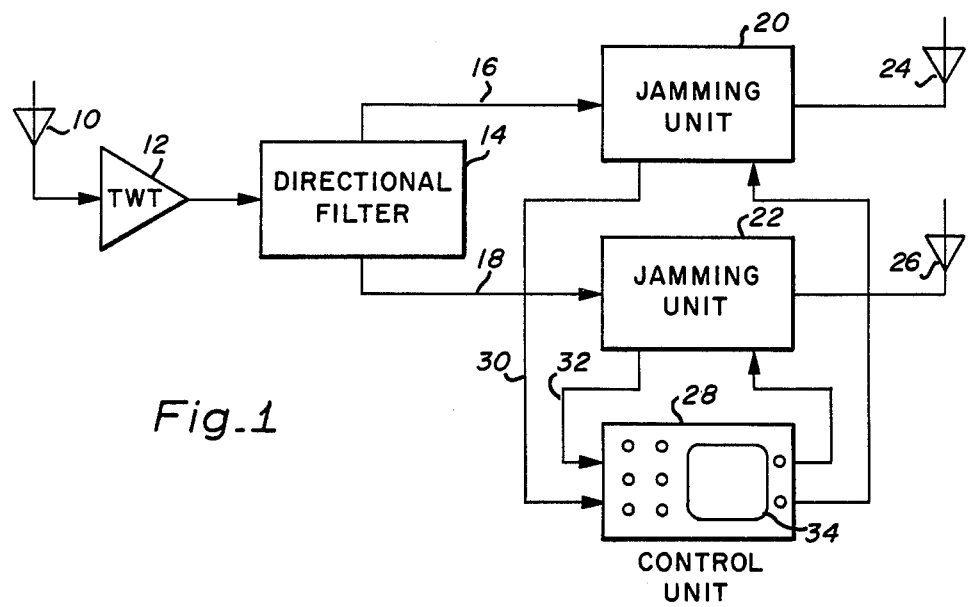
FIG. 1 is a block diagram illustrating the basic component of a dual beam radar jamming system in accordance with the present invention.

Referring now to FIG. 1 of the drawing, there is shown a schematic block diagram of a dual beam jamming system in accordance with the present invention. The radar signal receiving portion of the system includes an appropriate receiving antenna 10 and a low noise traveling-wave tube (TWT) 12 responsive thereto. Antenna 10 may take the form of a single omnidirectional antenna or several unidirectional antennas which are sequentially scanned through the use of appropriate switching means to provide either partial or complete azimuthal coverage. The signals received on antenna 10 are coupled into TWT 12 for amplification to nullify insertion losses that occur as the signals are passed through subsequent filters, hybrids, and cables in the system. After amplification in TWT 12, the received signals are directed into a directional filter 14 which separates the input signals into two channels for output to the leads 16 and 18 respectively. This filter has the property of separating narrow bands of frequencies out of a broad spectrum and routing these frequencies to one port (lead 16) of the device with essentially a unity coupling coefficient. The remainder of each band is then routed to a second port (lead 18), also with unity coupling coefficient.

Leads 16 and 18 couple the signals output from filter 14 into two independently operating repeater type jamming units 20 and 22 which amplify and retransmit via the antennas 24 and 26 respectively, the received radar pulses input thereto. Jamming units 20 and 22 have the capability of modulating the received input signals by increasing the amplitudes of certain ones of the input pulses as will be explained below and include logic circuitry for separating each of several incoming pulse trains representing individual radars so as to enable separate handling of each of the received radar signals.

Although not shown, the input section of the system also includes detector preamplifiers, video steering networks to accommodate any antenna switching functions, and other ancillary supportive electronic components. The system also includes certain logic circuitry which aids in routing the correct pulse to each jamming unit on a full-time basis to insure that the omnidirectionally received pulses reach the jamming unit containing the corresponding RF separated signal.

A control unit 28 having a plurality of front mounted control knobs and switches and a dual gun CRT display scope is coupled to jamming units 20 and 22 by leads 30 and 32 respectively, and includes means for selecting certain ones of the pulse trains separated in the jamming units. The selected pulse trains, corresponding to a particular radar, are then displayed individually on the scope 34 so as to enable the operator to visually inspect the signal of the radar which is tracking his aircraft. Control unit 28 also includes means for enabling the operator to selectively modulate the repeated pulse trains which are generated by jamming units 20 and 22.

The control-display unit 28 combines the operation of both jamming units into a single unit at the operator console. Operator controls are placed in a dual set so that each main unit has a separate read-out and control. Pushbutton lights present information on the status of the jammer logic and also are used to control the jammer and direction indicating system interface. For example, CS and TWS lights may denote the presence of one or the other of these threats in each signal sorter channel and one row of switches may be associated with the high beam jammer while another row is associated with the low beam jammer. The operator thus has presented to him the complete status of the dual channel jamming system. The console may also include a light that will be illuminated when the pulse train in that particular signal sorter channel is correlated with a guidance signal from certain guidance radars to alert the operator of an imminent missile launch. If the operator wishes to commence manual jamming, he will depress the pushbutton corresponding to the channel he wishes to jam.

The purpose of the large display CRT in the control unit is to provide the operator with a replica of the received signal from each channel of the radar on a separate display. The $3\frac{1}{2}''\times 3\frac{1}{2}''$ display CRT is a dual gun tube with each gun displaying the output from one of the main units of the dual channel jammer. The signal displayed in each case will be from the particular channel of the signal sorter selected by the operator.

Figure 5:
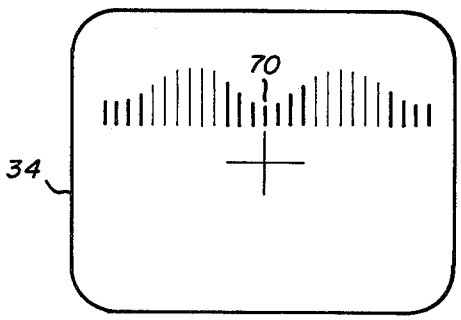
FIG. 5 and FIG. 6 illustrate exemplary jammer displays of the type provided in accordance with the present invention.
Figure 6:
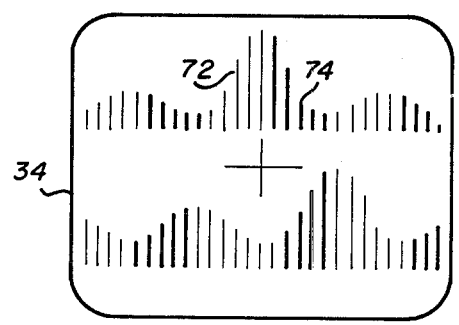

Once the operator has switched the desired signal to the display, normal synchronization procedures are used to "stop" the scope presentation. This switching operation will also connect the modulation output from the control unit to the channel selected. In the case of a TWS signal, a signal will be presented on both the upper and lower CRT beams, and a variable frequency sine wave oscillator will be switched into the modulation circuits. By observing the CRT presentation and operating the variable frequency knobs beside the display, the operator can manually jam the two beams of the radar independently. A portion of the jamming modulation signal is coupled off the modulator, chopped, and used to intensify the CRT display on a pulse-by-pulse basis as illustrated in FIG. 5 and FIG. 6. The displayed pulses are intensified during the peak power portions of the jammer modulation cycle and dimmed through the troughs of jammer power output. In this manner, the operator will see presented the effect of the jamming modulation superimposed on the radar modulation.

The sine wave oscillator output from the modulator produces a sharp-peaked, broad-troughed periodic signal which resembles the inverted main beam shape of the TWS radar. The operator can vary this signal in frequency and thus place the peaks or troughs wherever he desires relative to the main lobe of the received signal. With some practice the operator can work both beams simultaneously and "wobbulate" the jamming signal against the received signal. Flight tests have shown manual square-wave-modulated jamming to be effective except for the fact that the "off" time of the modulation can uncover the target, and the sharp on-off waveform makes the jamming somewhat easy to read through. The manual frequency-modulated sine-wave will circumvent these problems while maintaining the advantages of manual jamming operating against the manual radar. The display unit also allows the operator to assess jammer effectiveness by noting the position of the main lobe relative to the active scanning time as jamming progresses. The greater the distance of the main lobe from the center of the scan, the more inaccurately the radar is tracking.

Figure 2:
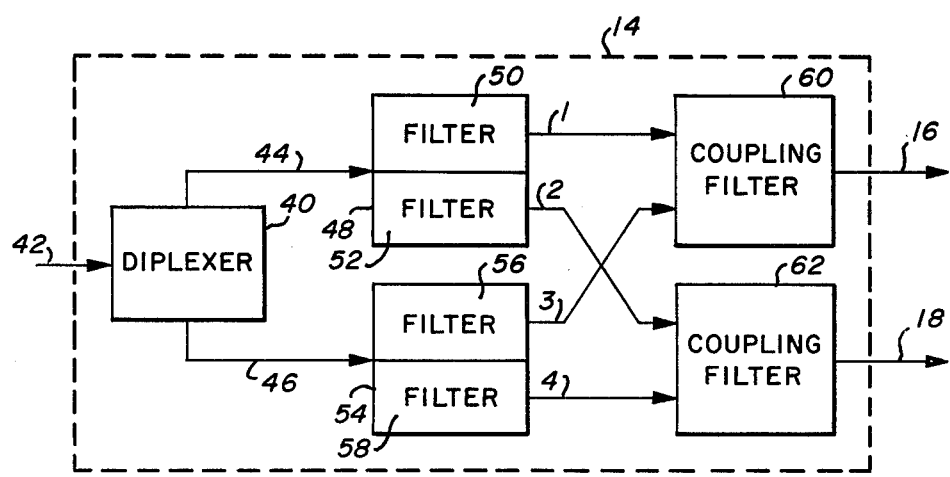
FIG. 2 is a block diagram illustrating certain component parts of the directional filter shown in FIG. 1.
Figure 3A:
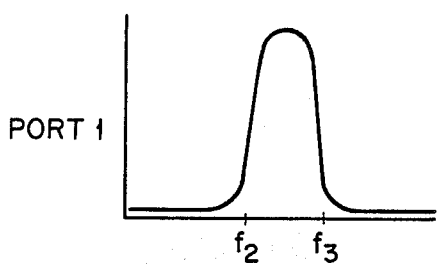
FIGS. 3A-3D illustrate the bandpass and bandstop characteristics of certain components of the directional filter illustrated in FIG. 2.

In FIG. 2 of the drawing the directional filter 14 is shown in more detail and includes a diplexer 40 which receives the input signals from TWT 12 at terminal 42 and separates out those signals appearing within a first band of frequencies and routes them to a line 44. Similarly, diplexer 40 separates those signals which fall within a second band of frequencies and routes them to line 46. Line 44 couples the signals in the first band into a first filter set 48 which includes a band stop filter 50 having a stop band, such as that illustrated in FIG. 3A of the drawing, for attenuating all signals falling within the frequencies $f_2$ and $f_3$ while passing all other frequencies to port 1. Filter set 48 also includes a bandpass filter 52 which has a passband of the type illustrated in FIG. 3B wherein all frequencies outside the band between frequencies $f_2$ and $f_3$ are attenuated and those frequencies falling within the band between $f_2$ and $f_3$ are passed to port 2.

Figure 3C:
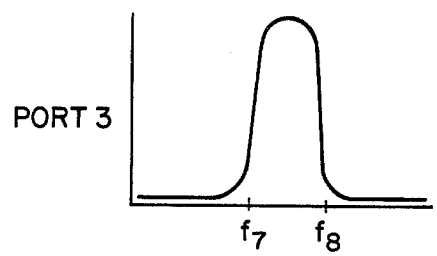
Figure 3B:
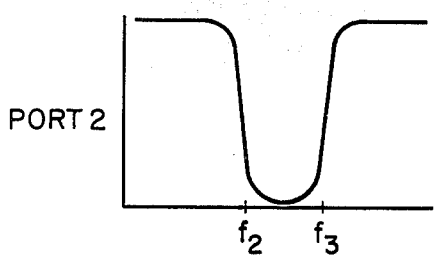
Figure 3D:
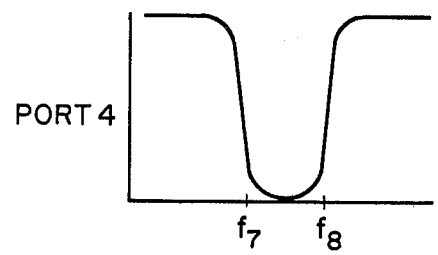

A second filter set 54 likewise includes a bandstop filter 56 having the frequency attenuation characteristics illustrated in FIG. 3C and a bandpass filter 58 having the frequency pass characteristics illustrated in FIG. 3D of the drawing. As in the previously described filter set, filters 56 and 58 stop and pass respectively, frequencies falling within the frequency range between $f_7$ and $f_8$. The output of filter 56 is provided at port 3 and the output of filter 58 is provided at port 4. For reasons which will be described below with respect to FIG. 4, it is desirable that the radar signals appearing at ports 1 and 3 be coupled into the jamming unit 20 while the radar signals appearing at ports 2 and 4 be coupled into the jamming unit 22. Accordingly, a pair of hybrid coupling fibers 60 and 62 are provided which combine the signals input thereto. The combined signals are then coupled into jamming units 20 and 22 through the leads 16 and 18 respectively.

Figure 4:
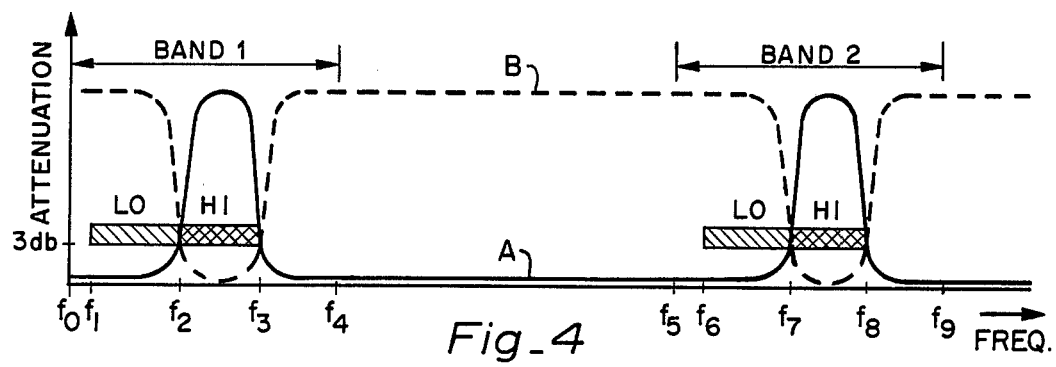
FIG. 4 is a radar frequency vs. attenuation diagram illustrating the basic operational characteristics of the present invention.

Turning now to FIG. 4 of the drawing which is a diagram plotting attenuation vs. frequency over a particular range of radar frequencies, the operation of the jamming system will be explained with more particularity. Lying within the illustrated frequency range are at least two bands of frequencies which are commonly identified in radar technology and are for purposes of illustration here designated as bands 1 and 2. In this instance band 1 is illustrated as being bounded by the frequencies $f_0$ and $f_4$, whereas band 2 is bounded by the frequencies $f_5$ and $f_9$. Using reconnaissance information and other technical criteria, it has been determined that the enemy typically uses radar frequencies within certain ones of these bands for certain purposes. For example, there may be a high probability that one of the antennas of a TWS dual scan radar system operating in band 1 will operate at a frequency in a low sub-band lying between the frequencies $f_1$ and $f_2$ while the other antenna will operate in a high sub-band lying between the frequencies $f_2$ and $f_3$. Similarly, for radars operating in band 2, there may be a high probability that one of the antennas of a TWS dual scan system will operate at a frequency in the low sub-band between frequencies $f_6$ and $f_7$ while the other antenna will operate in the high sub-band between the frequencies $f_7$ and $f_8$. The indicated relationships of these bands are arbitrarily chosen herein for purposes of illustration. Thus, in order to enable one of the jamming units 20 and 22 to continuously receive signals corresponding to only the low beams of enemy radar units while enabling the other jamming unit to receive only those signals corresponding to the high beams of enemy radars, the directional filter 14 described above is utilized to separate out the proper frequencies for input to the respective jamming units.

In FIG. 4, the curve A illustrates the relative attenuation of the various frequencies of the signals which are input into jamming unit 20. Curve A indicates that the high beam frequencies of both bands are attenuated sufficiently so that they are not input into jamming unit 20. On the other hand, the curve B illustrates the relative attenuation of frequencies over the same range and indicates that all frequencies except those falling within the high beam ranges of each band will be severely attenuated so that only the high beam signals will be input into jamming unit 22. Comparison of the curves of FIG. 4 with the curves of FIGS. 3A-3D will indicate that curve A corresponds to the sum of the curves in FIGS. 3A and 3C, while curve B is comprised of the sum of the curves in FIGS. 3B and 3D.

The high passbands of filter 14 are preferably fixed-tuned to the 90-percent points of the observed frequency distributions of the high beams of enemy TWS radars, thus separating out the high channels in each band and routing to jamming unit 22. Any other radar signals falling within the high sub-bands will, of course, also be routed to unit 22. The low beams and most other radar signals will be routed to jamming unit 20. The crossover points of the respective filters are 3 dB down from the peak, so no signal in the entire band will rceive more than 3 dB attenuation due to the filter. This characteristic, shown in FIG. 4, will handle almost any frequency separation of the TWS radar, and even in the worst case both beams will fall in one passband and both will be routed to the same jamming unit. The signal that is stopped in each band will be a minimum of 40 dB below the signal that passes.

Assuming now that the aircraft carrying the jamming system is being tracked by one or more enemy radars operating in the bands 1 and 2, warning devices on control unit 28 will indicate to the operator that his aircraft is being detected by enemy radars using certain frequencies. By closing the proper switch, the operator can selectively display the incoming pulse trains on the scope 34 enabling him to observe the degree of tracking provided by that radar. Where the observed signal is from a conical scan radar, which utilizes only one series of pulses, the selected pulse train will be displayed at either the top or the bottom of the scope 34 as indicated in FIG. 5, depending upon where the particular frequency lies within the frequency range illustrated in FIG. 4. For example, if the conical scan frequency lies between the frequencies $f_0$ and $f_2$, or $f_3$ and $f_7$, or $f_8$ and $f_9$, then the received pulse train would be displayed on the bottom portion of the scope 34 as indicated in FIG. 5. However, if the CS radar is operating within the band of frequencies between $f_2$ and $f_3$, or $f_7$ and $f_8$, then the pulse train would be displayed at the top of scope 34. In any case, the display makes it possible for the operator to view directly the radar pulses with which his aircraft is being tracked. In order to confuse the tracking radar, the operator can, by appropriately manipulating certain controls on the control unit 28, cause the amplitudes of certain ones of the received pulses to be retransmitted at higher intensities than that of the received pulses.

Appropriate jamming modulation is applied on a pulse-by-pulse basis to each signal in its separate channel. The sine wave modulation which is characteristic of a conically scanning radar can thus be squared, inverted, and repeated in an inverse manner much as has been done in the past. In actuality, the tandem IM/SM mode is used so that swept modulation may be applied to a non-modulated signal and inverse modulation applied when scanning is evident. This type of modulation is applied automatically to the proper pulse train coming out of the sorter and identification circuits. In addition, there is available in the system control unit manually controlled modulation signals that can be switched onto a selected channel. Thus, a variable frequency AM signal, controlled by the operator, can be applied to one prime threat. These pulses of increased amplitude will then be indicated on the scope 34 as brighter lines such as shown at 70. Thus, the operator can simultaneously determine both the degree of tracking, by noting the relative amplitudes of the various pulses, and the particular nature of his deceptive action by noting the intensity of the pulses 70 in the displayed pulse train.

On the other hand, should the tracking radar be of the TWS type, one of the beams will most likely fall within the low beam range while the other beam will fall in the high beam range and the operator can cause both the low and high beam signals to be displayed simultaneously on the scope 34 as illustrated in FIG. 6. As in the case of the previously described conical scan radar, the received pulses will be displayed and the tracking accuracy may be noted. However, in this case, because of the characteristics of the received radar signals the pulses will not be in the form of a sine wave modulated pulse train but will be in the form of a frequency distribution indicative of the antenna pattern of a particular type of radar with the pulses of largest amplitude corresponding to the main lobe of the radar and pulses of lesser amplitude corresponding to the side lobes of the radar. Where the main lobe, such as that shown at 72 in FIG. 6, falls within the center of the scope 34, the operator will know that he is being closely tracked and will accordingly cause the jamming unit generating the return pulses to increase the amplitudes of the pulses on one side or the other of the main lobe in order that the signal received by the enemy radar will tend to indicate that the aircraft is to the right of its actual position. This should cause the tracking mechanism to shift to the right and the effectiveness of this maneuver can be noted by the operator by noting a shift to the right on his scope of the lobe 72. By wobbulating the Z axis modulation, indicated by the brighter lines 74, the operator can variably mislead the enemy radar tracking apparatus. The low beam pulses are displayed at the bottom of the scope 34 so that the operator can also perform the same type of deception with respect to the horizontal scanning antenna (where the upper display corresponds to the vertical scanning antenna).

Two automatic modulation methods are available in the jammer for use against track-while-scan threats. The logic in these circuits applies one modulation method or the other, depending on the range (and thus the signal strength) of the threat. At longer ranges the modulation applied uses inverse gain in which the output power from the jammer is approximately inversely proportional to the input power level. This technique has the effect of flattening out the modulation signal into the radar tracking circuits, and it is more effective at ranges from 15 to 25 nautical miles out, where the main lobe reflected signal power level is sufficiently low to be covered by the reduced power output of the jammer. In addition to the inverse gain technique, auxiliary modulation at harmonics of the scan frequency is applied during main lobe and sidelobe time. This auxiliary modulation is frequency modulated over a narrow range to ensure that the jamming signal gets through the radar tracking loop bandwidth limitation.

The man-on-man (MOM) technique is a distinct addition to presently available TWS jamming techniques. Separation of the beams at RF and display of these signals on separate CRT beams allows the operator to synchronize manually the modulation waveform with respect to the radar scan and to perform this operation independently on each beam. In addition, the operator can assess the effectiveness of his jamming by noting the relative motion of the radar scan pattern and by noting the position of the main lobe relative to the total radar scan time. This occurs because the main lobe appears at the center of the scan at a given aircraft receiver when that aircraft is the prime target of the radar, and the main lobe will move relative to the radar scan period if the center of the scan sector moves off the target. The system threshold is low enough to allow a considerable portion of the total scan to be displayed.

A key provision of the system is the use of an operator for the direct control of jamming modulation and assessment of jamming effectiveness. The system provides several improvements and advantages over present jamming systems in the areas of multiple signal handling, TWS jamming capability, and special control and display devices.

The present invention provides the following dual channel advantages:

1. Reduced cross-coupling of main lobe down-modulation.
2. Reduced small signal suppression in TWT's.
3. Reduced intermodulation distortion in TWT's.
4. 3 dB more power against each beam.
5. Capability of observing and modulating each beam separately.
6. No recovery time limitations against non-simultaneous pulses from beam radars.

The present invention offers the following manual modulation waveform advantages:

1. Capability for matching down-modulation to beam shape by frequency adjustment.
2. Alternatives of using trough, peak, or intermediate point on modulation waveform against main lobe peak.
3. No sharp on-off points uncovering target during off gate.
4. Capability for down-modulating precisely on main lobe peak while putting full power into first pattern nulls.
5. No waste of jammer power on free-running modulation.
6. Capability for manual angle-gate walkoff.

Another advantage of the present invention is that in the event of failure of one of the jamming units, e.g., the low beam jammer, the system will then normally operate only against the high beam of TWS radars. However, by using a Normal-Reverse relay, the operator can cause the remaining unit to switch over and operate against the low beam only. Although this action will exclude the TWS high beam from jamming, and while the system will be operating at reduced capability, it will be effective against most threats.

It is contemplated that numerous modifications to the present invention will become apparent to those skilled in the art after having read the foregoing disclosure. It is therefore to be understood that the described preferred embodiment is made for purposes of illustration only and is in no way to be considered limiting. Accordingly, it is intended that the appended claims be interpreted to include all such modifications as fall within the true spirit and scope of the invention.

What is claimed is:

1. A dual beam radar jamming system, comprising:
   radar receiver means responsive to input radar signals having freqencies within a first frequency band including a first sub-band and a second sub-band and operative to develop a broad band signal commensurate therewith;
   directional filter means responsive to said broad band signal and operative to separate first radar signals having frequencies within said first sub-band and second radar signals having frequencies within said second sub-band;
   control means for developing a first control signal and a second control signal;
   first repeater means responsive to said first control signal and operative to amplitude modulate said first radar signals to develop first jamming signals; and
   second repeater means responsive to said second control signal and operative to amplitude modulate said second signals to develop second jamming signals.

2. A dual beam radar jamming system as recited in claim 1 wherein said control means includes means for simultaneously displaying visual analogs of at least one of said first and second radar signals and its corresponding jamming signal.

3. A dual beam radar jamming system as recited in claim 1 wherein said receiver means comprises means being responsive to additional input radar signals having frequencies within a second frequency band including a third sub-band and a fourth sub-band and is further operative to cause said broad band signal to include said additional input radar signals, and wherein said directional filter means comprises means being operative to separate third radar signals having frequencies within said third sub-band and fourth radar signals having frequencies within said fourth sub-band, said first repeater means comprises means being responsive to said first control signal and operative to amplitude modulate said third radar signals to develop third jamming signals, and said second repeater means comprises means being responsive to said second control signal and operative to amplitude modulate said fourth radar signals to develop fourth jamming signals.

4. A dual beam radar jamming system as recited in claim 3 wherein said control means includes a signal display means for displaying visual analogs of selected ones of said jamming signals.

5. A dual beam radar jamming system, comprising:
   radar receiver means responsive to input radar signals having frequencies within a first frequency band including a first sub-band and a second sub-band, and a second frequency band including a third sub-band and a fourth sub-band, said receiver means being operative to develop a broad band signal commensurate with said input radar signals;
   directional filter means responsive to said broad band signal and operative to develop first, second, third and fourth radar signals corresponding respectively to input radar signals falling within said first, second, third and fourth sub-bands;
   control means for developing a first control signal and a second control signal;
   first repeater means responsive to said first control signal and operative to amplitude modulate at least one of said first and third radar signals to develop corresponding jamming signals;
   second repeater means responsive to said second control signal and operative to amplitude modulate at least one of said second and fourth radar signals to develop corresponding jamming signals.

6. A dual beam radar jamming system as recited in claim 5 wherein said directional filter means includes means for separating said broad band signal into a first intermediate signal including radar signals falling within said first frequency band, and a second intermediate signal including radar signals falling within said second frequency band; and
   filter means for separating said first and second radar signals out of said first intermediate signal, and for separating said third and fourth radar signals out of said second intermediate signal.

7. A dual beam radar jamming system as recited in claim 5 wherein said control means includes means for developing visual analogs of selected ones of said first, second, third and fourth radar signals.

8. A dual beam radar jamming system as recited in claim 5 wherein said control means includes means for developing visual analogs of selected ones of said jamming signals.

* * * * *